United States Patent [19]

Murase et al.

[11] 4,261,454

[45] Apr. 14, 1981

[54] CLUTCH RELEASING DEVICE

[75] Inventors: Hisao Murase; Ryoichi Kudo, both of Toyota; Hideichi Hori, Tokai, all of Japan

[73] Assignee: Aisin Seiki Kabushiki Kaisha, Kariya, Japan

[21] Appl. No.: 12,484

[22] Filed: Feb. 15, 1979

[30] Foreign Application Priority Data

Mar. 2, 1978 [JP] Japan .................................. 53/23861

[51] Int. Cl.$^3$ ...................... F16D 13/44; F16D 13/75
[52] U.S. Cl. .............................. 192/70.25; 192/70.28; 192/111 A
[58] Field of Search ................ 192/70.28, 70.25, 89 B, 192/101, 111 A; 188/72.3, 216

[56] References Cited

U.S. PATENT DOCUMENTS

| | | | |
|---|---|---|---|
| 2,417,856 | 3/1947 | Barish | 188/72.3 |
| 3,700,084 | 10/1972 | Nasu et al. | 192/70.28 |
| 3,702,651 | 11/1972 | Fujita et al. | 192/70.28 X |
| 3,773,155 | 11/1973 | Fujita et al. | 192/70.28 X |
| 3,791,502 | 2/1974 | Nakane | 192/70.28 X |
| 3,815,714 | 6/1974 | Hiraiwa | 192/70.25 |
| 3,822,772 | 7/1974 | Murakami | 192/70.28 X |
| 3,834,501 | 9/1974 | Adachi | 192/70.28 |
| 3,933,230 | 1/1976 | Adachi | 192/70.28 |
| 4,141,441 | 2/1979 | Fukatani | 192/70.28 X |

*Primary Examiner*—Rodney H. Bonck

*Attorney, Agent, or Firm*—Oblon, Fisher, Spivak, McClelland & Maier

[57] ABSTRACT

A clutch releasing device for positively releasing a clutch disc assembly from a flywheel of automotive vehicles which includes a first member disposed between the clutch disc assembly and a pilot bearing for receiving the extreme end of the transmission input shaft and which is in contact with the side face of an inner race of the pilot bearing, a second member operatively connected to the clutch disc assembly with respect to axial movement thereof and an annular resilient member disposed between the first member and the second member so as to cause the deformation of the annular resilient member when clutch is engaged. When the clutch is released, the clutch disc assembly is released by the resiliency of the annular resilient member from the flywheel until the annular resilient member returns to its original shape. The annular resilient member is axially slidably mounted on either the first member or the second member with a predetermined sliding resistance so as to cause slippage according to the wear of the friction facing of the clutch disc assembly, therebetween. The connection between the second member and the clutch disc assembly is radially outwardly positioned above spacer rivets of the clutch disc assembly so as to reduce the erroneous axial movement of the second member in assembling of the clutch.

10 Claims, 12 Drawing Figures

CLUTCH RELEASING DEVICE

BACKGROUND OF THE INVENTION

1. Field of the Invention

The present invention relates to clutch releasing devices for clutch assemblies adapted for use on automotive vehicles, and more particularly to clutch releasing devices for positively releasing a clutch disc assembly from a flywheel of vehicles.

2. Description of the Prior Art

It is desirable in clutch assemblies that disengagement of the clutch be accomplished quickly without any drag. However, in conventional clutch assemblies, a clutch disc assembly is adapted to be released from the flywheel only by vibration of the automotive engine and the like. Consequently, the friction facings of the clutch disc assembly are likely to adhere to the flywheel even when a pressure plate is completely disengaged, the friction facings of the clutch disc assembly being compressed by the flywheel and the pressure plate during clutch engagement.

In order to improve the above drawback, clutch releasing devices for positively releasing the clutch disc from the flywheel have been proposed. However, in some of them, the position of the clutch disc assembly released from the flywheel is constant, so that the clutch disc assembly is in turn likely to adhere to the pressure plate upon clutch disengagement since the position of the pressure plate is displaced toward the clutch disc assembly in accordance with the wear of the friction facings so as to maintain the clutch pedal stroke as constant. In another type of clutch releasing device wherein the position of the clutch disc assembly released from the flywheel is automatically displaced toward the flywheel in accordance with the wear of the friction facings, the clutch releasing device acts upon the wear of the friction facings through the axial movement of a hub of the clutch disc assembly. However, the hub of the clutch disc assembly is normally urged to move toward the flywheel by a transmission input shaft during assembly of the clutch assembly, so that the clutch releasing device fails to release the clutch disc from the flywheel.

SUMMARY OF THE INVENTION

It is, therefore, the main object of the present invention to solve the above drawbacks of the conventional clutch releasing device.

Another object of the present invention is to provide a clutch releasing device for positively releasing the clutch disc from the flywheel wherein the position of the clutch disc assembly released from the flywheel is automatically displaced toward the flywheel in accordance with the wear of the friction facings and the clutch disc assembly will be surely released from the flywheel if the hub of the clutch disc assembly will be firmly urged by the transmission input shaft during assembly of the clutch.

Various other objects, features and attendant advantages of the present invention will be more fully appreciated as the same becomes better understood from the following detailed description when considered in connection with the accompanying drawings in which like reference characters designate like or corresponding parts through the several views and wherein:

DETAILED DESCRIPTION OF THE PREFERRED EMBODIMENTS

Figure 1:
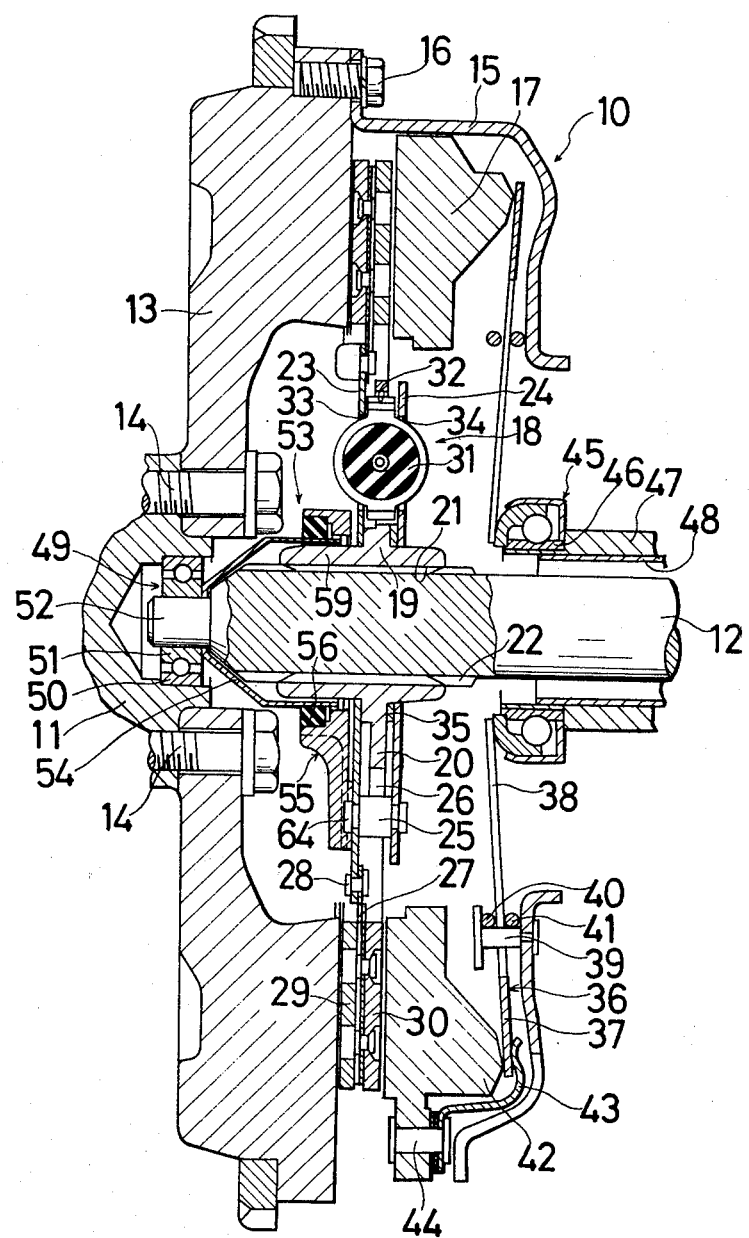
FIG. 1 is an axial sectional view of a clutch assembly incorporating a first embodiment of the clutch releasing device according to the present invention, the clutch assembly being shown in its released condition.
Figure 2:
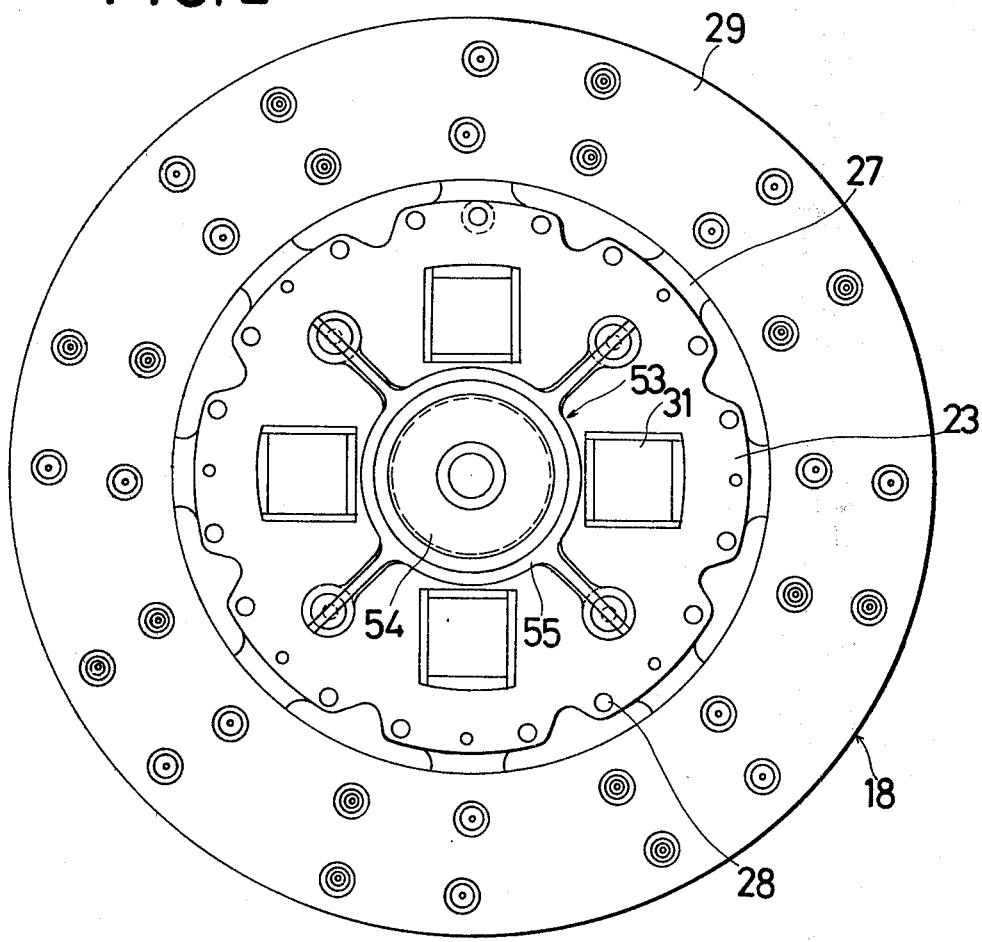
FIG. 2 is a side view of the clutch disc assembly and the clutch releasing device shown in FIG. 1.
Figure 3:
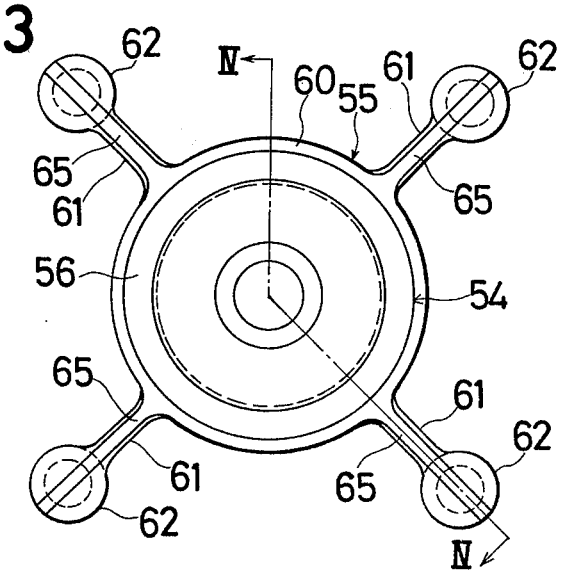
FIG. 3 is an enlarged side view of the clutch releasing device shown in FIG. 1.
Figure 4:
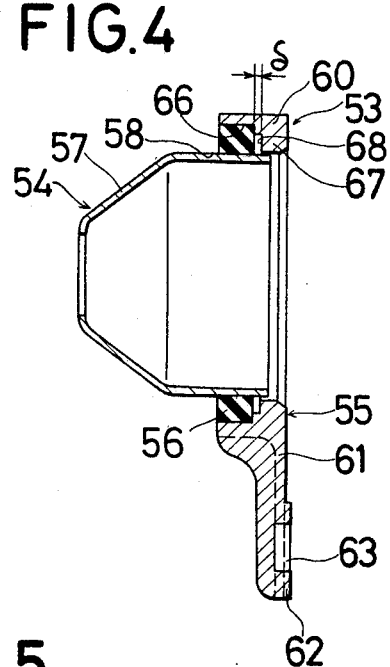
FIG. 4 is an axial section view taken along line IV—IV in FIG. 3.

Referring to the drawings, the the reference numeral 10 designates generally a clutch assembly to transmit drive from an engine crankshaft 11 to a transmission input shaft 12. The clutch assembly 10 includes a flywheel 13 concentrically and fixedly attached to the engine crankshaft 11 by fixing bolts 14. The assembly 10 also includes a clutch cover 15 attached to the flywheel 13 by fixing bolts 16 and an annular pressure plate 17 axially movably and unitarily rotatably attached to the clutch cover 15 a a conventional attaching manner. The assembly 10 further includes a clutch disc assembly 18 slidably mounted on the transmission input shaft 12.

The clutch disc assembly 18 provides for a hub 19 having a flange 20 extending radially outwardly therefrom. The hub 19 is provided with a splined bore 21 to cooperate with a spline 22 on the transmission input shaft 12 whereby the assembly 18 is drivingly mounted on the shaft 12 and is adapted for sliding movement in the longitudinal direction thereon. The assembly 18 also includes an annular clutch plate 23 positioned at one side of the flange 20 and a side washer 24 positioned at the other side of the flange 20. The clutch plate 23 and the side washer 24 are rotatably supported on the hub 19 and are connected to each other by spacer rivets 25 passed through noches 26 extending inwardly from the periphery of the flange 20. The clutch plate 23 carrys a plurality of circumferentially spaced and radially outwardly extending spring cushions 27 riveted to the outer periphery of the clutch plate 23 by rivets 28. The spring cushions 27 support annular friction facings 29 and 30 on opposite sides thereof adapted to be compressed between the flywheel 13 and the pressure plate 17. Torsion damper members 31 are rigidly mounted in openings 32,33 and 34 formed in the flange 20, clutch plate 23 and washer 24, respectively, for providing a flexible or yieldable driving connection between the clutch plate 23 and the hub 19. A friction washer 35 is interposed between the inner periphery of the flange 20 and the inner periphery of the washer 24.

A diaphragm spring 36 disposed axially inside the clutch cover 15 includes an annular spring portion 37 and release fingers 38 which extend radially inwardly from the annular spring portion 37. The diaphragm spring 36 is secured to the clutch cover 15 by rivets 39. Pivot rings 40 and 41 are disposed on the axially inner and outer sides respectively of the diaphragm spring 36 and around the rivets 39 to serve as a fulcrum for movement of the diaphragm spring 36. The outer peripheral portion of the annular spring portion 37 abuts on the top of the projections 42 on the pressure plate 17. The diaphragm spring 36 normally urges the pressure plate 17 toward the flywheel 13. Spring clips 43 are secured to the pressure plate 17 by rivets 44 and are adapted to retain the outer periphery of the diaphragm spring 36 against the projections 42 so that the pressure plate 17 is adapted to be moved in conformity with movement of the outer periphery of the diaphragm spring 36.

A release bearing 45 is rigidly mounted at its inner race 46 on the bearing hub 47 which is axially slidably mounted on the tube 48. The tube 48 is arranged concentrically to the transmission input shaft 12 and is rigidly mounted on the transmission case, not shown. The bearing hub 47 is operatively connected to a clutch pedal, not shown, the a conventional connecting manner.

A pilot bearing 49 is rigidly fitted at its outer race 50 in an inner periphery of the engine crankshaft 11. An inner race 51 of the pilot bearing 49 supports an extreme end 52 of the transmission input shaft 12. It is to be noted that the pilot bearing may be fitted in an inner periphery of the flywheel 13.

A clutch releasing device is generally indicated by reference numeral 53. The clutch releasing device 53 disposed between the clutch disc assembly 18 and the inner race 51 of the pilot bearing 49 includes a first member 54, a second member 55 and an annular resilient member 56 made of rubber and the like. The first member 54 is arranged concentrically with respect to the transmission input shaft 12 and includes a tapered cylindrical portion 57 being in contact with the side face of the inner race 51 at its one end and a straight cylindrical portion 58 axially extending from the other end of the tapered cylindrical portion 57. The straight cylindrical portion 58 has an inner diameter larger than an outer diameter of a boss portion 59 of the hub 19. The axial length of the first member 54 is designed to allow the sliding movement of the hub 19 in accordance with wear of the friction facing 29. The second member 55 includes an annular portion 60 surrounding the outer periphery of the straight cylindrical portion 58 of the first member 54 and a plurality of arm portions 61 radially outwardly extending from the outer periphery of the annular portion 60. The second member 55 is made of synthetic resin so as to reduce the weight thereof.

The arm portions 61 are provided with enlarged portions 62 at extreme ends thereof. The enlarged portions 62 are provided with recesses 63 receiving the ends 64 of the spacer rivets 25 and are in contact with the side face of the clutch plate 23 of the clutch disc assembly 18. The arm portions 61 are also provided with the reinforcing ribs 65 to prevent the arm portions 61 from the axial deformation thereof. The annular portion 60 is provided on its inner wall with an annular recess 66 which rigidly receives the outer peripheral portion of the annular resilient member 56. The annular portion 60 is also provided on its inner wall with an annular flange 67 which is axially positioned between the annular resilient member 56 and the clutch plate 23. The annular flange 67 has an inner diameter larger than an outer diameter of the straight cylindrical portion 58 of the first member 54.

A side face 68 of the annular flange 61 is axially spaced from the annular recess 66 by an axial space δ which corresponds with a desired space between the flywheel 13 and the friction facing 29 under a clutch releasing condition. The annular resilient member 56 has a rectangular cross-section and frictionally engages at its inner peripheral surface with the outer surface of the straight cylindrical portion 58 of the first member 54 so as to cause a predetermined sliding resistance therebetween. This predetermined sliding resistance is stronger than the desired thrust force for sliding movement of the clutch disc assembly 18 on the transmission input shaft 12. The resiliency of the annular resilient member is sufficient to slide the clutch disc assembly 18 on the transmission input shaft 12 under clutch releasing condition.

In operation, in the normal condition wherein the clutch pedal, not shown, is at its released position, the pressure plate 17 is axially shifted by the diaphragm spring 36 to the left from the position shown in FIG. 1 until the frictional facings 29 and 30 of the clutch disc assembly 18 are sufficiently compressed between the flywheel 13 and the pressure plate 17, as well known. Therefore, the drive is transmitted from the engine crankshaft 11 to the transmission input shaft 12. In this condition, the clutch disc assembly 18 has been axially shifted to the left from the position shown in FIG. 1 due to the shift of the pressure plate 17, causing the second member 55 to axially shift to the left against the resiliency of the annular resilient member 56. Thus the annular resilient member 56 is resiliently deformed by movement of second member 55 until the inner peripheral portion of the side face 68 of the annular flange 61 is in contact with the side face of the annular resilient member 56.

When the driver of the vehicle depresses the clutch pedal, the release bearing 45 is axially moved in the leftward direction in FIG. 1 to the position shown in FIG. 1. Thus, the inner ends of the release fingers 38 of the diaphragm spring 36 are axially moved in the left direction in FIG. 1 to the position shown in FIG. 1, so that the outer periphery of the diaphragm spring 36 axially moves in the right direction in FIG. 1 to the position shown in FIG. 1. Therefore, the pressure plate 17 is axially moved in the rightward direction in FIG. 1 to the position shown in FIG. 1 and disengages from the friction facing 30 of the clutch disc assembly 18. Simultaneously, the second member 55 is, together with the clutch disc assembly 18, axially moved in the rightward direction in FIG. 1 by the resiliency of the annular resilient member 56 until the annular resilient member 56 returns to its original shape shown in FIG. 1. Thus, the friction facing 29 of the clutch disc assembly 18 rapidly disengages from the flywheel 13, the axial space δ is brought between the flywheel 13 and the friction facing 29 of the clutch disc assembly 18.

When the driver of the vehicle releases the clutch pedal so as to re-engage the clutch, the pressure plate 17 is axially moved in the left direction in FIG. 1 by the diaphragm spring 36, the friction facings 29 and 30 are compressed between the flywheel 13 and the pressure plate 17 again.

The clutch releasing device 53 functions as wear-compensating mechanism for the friction facings 29 and 30. When the friction facings 29 and 30 have been worn upon the clutch engagement, the side face 68 of the annular flange 61 of the second member 55 has made contact at its inner peripheral portion with the inner peripheral portion of the side face of the annular resilient member 56. The annular resilient member 56 is further urged at its outer and inner peripheral portions in the leftward direction in FIG. 1 before the friction facing 29 is brought into engagement with flywheel 13 since the axial space between the flywheel 13 and the friction facing 29 is larger than the axial space δ. Thus, the annular resilient member 56 will axially slide on the straight cylindrical portion 58 of the first member 54 in the leftward direction in FIG. 1 from the position shown in FIG. 1 since the sliding resistance of the annular resilient member 56 on the first member 55 is smaller than the axial thrust force exerted on the clutch disc assembly 18 due to the pressure plate 17. Thus, the suitable adjustment is made and wear on the facing 29 is readily compensated for so that the axial space between the flywheel 13 and the facing 29 under the clutch released condition is normally maintained as axial space δ.

In addition to above-described functions, if the hub 19 of the clutch disc assembly 18 is axially urged by the transmission input shaft 12 in the leftward direction in FIG. 1 during the assembling of the clutch assembly 10, the clutch releasing device 53 will surely disengage the facing 29 from the flywheel 13 when the pressure plate 17 is disengaged from the facing 30. Namely, the transmission input shaft 12 is inserted into the clutch assembly 10 under such condition wherein the clutch cover 15 attached with the pressure plate 17 and the diaphragm spring 36 has been secured to the flywheel 13 and the clutch disc assembly 18 attached with the clutch releasing device 53 has also been disposed in the clutch cover 15 and has been compressed at its facings between the flywheel 13 and the pressure plate 17. Therefore, the hub 19 is normally urged in the left direction in FIG. 1 because the spline 22 of the transmission input shaft 12 often contacts at its end surface with the hub 19. The axial force exerted on the hub 19 through the transmission input shaft 12 is about 50~100 kg. Thus, since the clutch disc assembly 18 does not have as much axial strength, the clutch disc assembly 18 is axially deflected in the left direction in FIG. 1 without friction facings 29 and 30 and the second member 55 of the clutch releasing device 53 being moved by the axial deflection of the clutch disc assembly 18 in the leftward direction in FIG. 1, but the second member 55 axially moves together with the spacer rivets 25 of the clutch disc assembly 18 since the second member 55 is in contact with the clutch plate 23 around the spacer rivets 25.

Figure 5:
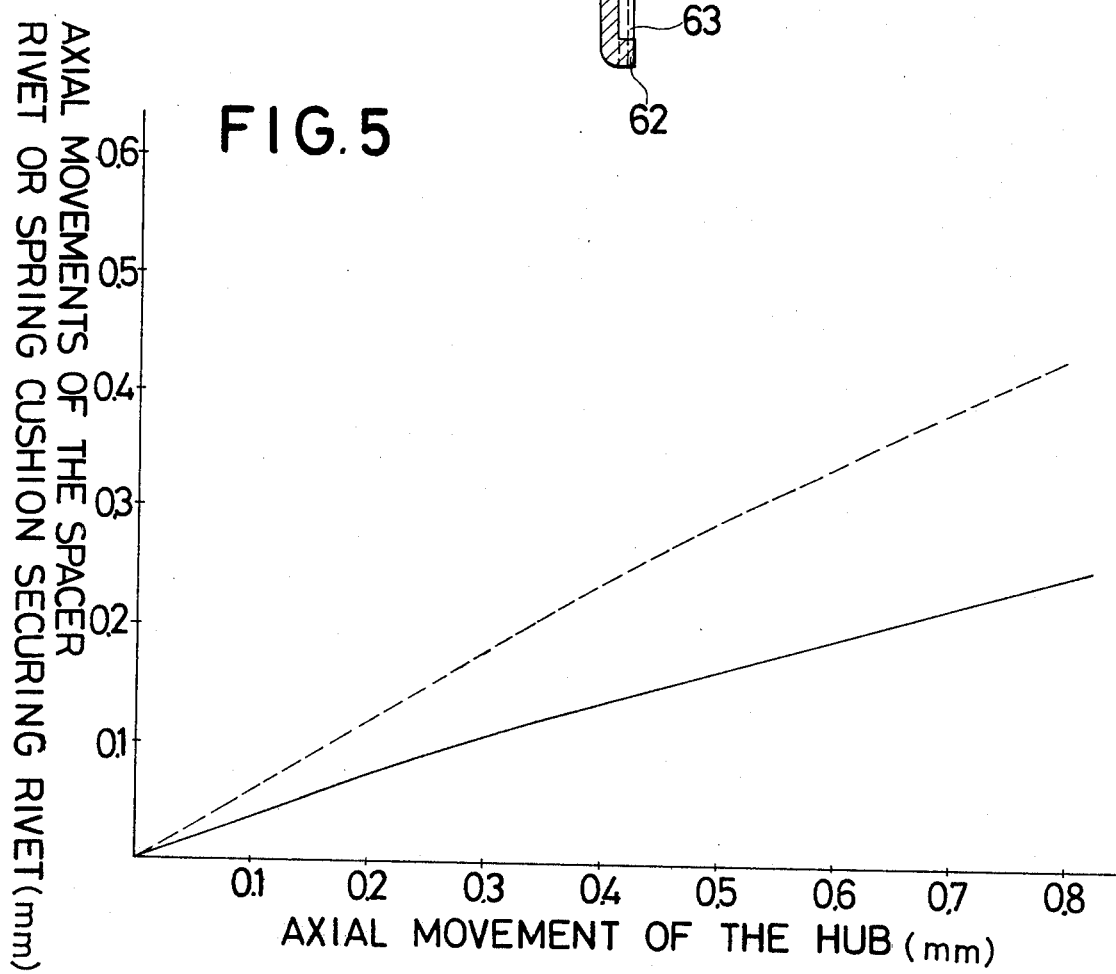
FIG. 5 is a graph which is showing axial movements of the spacer rivet and the spring cushion securing rivet of the clutch disc assembly shown in FIG. 1 with respect to the axial movement of the hub of the clutch disc assembly shown in FIG. 1.

FIG. 5 schematically illustrates the amount of the axial movement of the spacer rivets 25 and the rivets 28 with respect to the amount of the axial movement of the hub 19 when the hub 19 of the clutch disc assembly 18 is axially urged under such condition wherein the friction facings 29 and 30 are compressed between the two members such as flywheel 10 and the pressure plate 17, but the outer diameter of the clutch disc assembly 18 is about 200 mm. In FIG. 5, a dotted line shows the relation between the axial movement of the hub 19 and the axial movement of the spacer rivets 25, and a solid line shows the relation between the axial movement of the hub 19 and the axial movement of the rivets 28. In FIG. 5, when the axial force of 50~100 kg exerted on the hub 19, the hub 19 is axially moved by 0.5~0.8 mm and the spacer rivets 25 are axially moved by 0.3~0.45 mm. Therefore, in the case of the axial space δ is designed at 0.5 mm and the hub 19 of the clutch disc assembly 18 is urged by the transmission input shaft 12 during the assembling of the clutch assembly 10, the clutch releasing device 53 will surely disengage the facing 29 from the flywheel 13 when the pressure plate 17 is disengaged from the facing 30.

Figure 6:
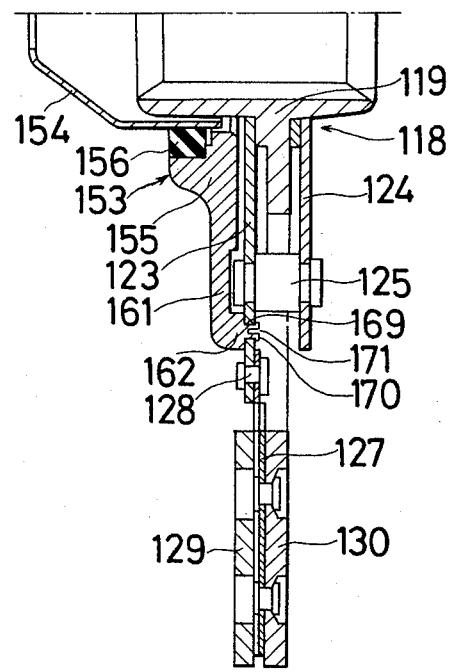
FIG. 6 is a half of an axial section view of a second embodiment of the clutch releasing device according to the present invention attached to the clutch disc assembly.

Referring to FIG. 6, there is shown a second embodiment of the present invention with the same structure as shown in the previously discussed first embodiment being designated with the same reference numerals in a 100 series. The difference from the foregoing embodiment resides in the connection between a clutch disc assembly 118 and a second member 155 of a clutch releasing device 153. A clutch plate 123 of the clutch disc assembly 118 is provided with holes 169 which are radially outwardly positioned further than spacer rivets 125. Contact portions 162 of the second member 155 of the clutch releasing device 153 are provided with axial mushroom shaped projections 170 to be passed through the holes 169 of the clutch plate 123. The mushroom projections 170 are provided with axial notches 171 so as to provide the conventional snap action with the mushroom projections 170. Thus, the assembling of the clutch assembly is improved over that of the first embodiment since the clutch disc assembly 118 and the clutch releasing device 153 are handled as one unit during assembly of the clutch assembly. In addition to foregoing improvement, incorrect movement of the second member 155 in assembling of the clutch assembly is improved over that of the first embodiment since the contact portions 162 of the second member 155 are radially outwardly positioning further than the spacer rivets 125.

Figure 7:
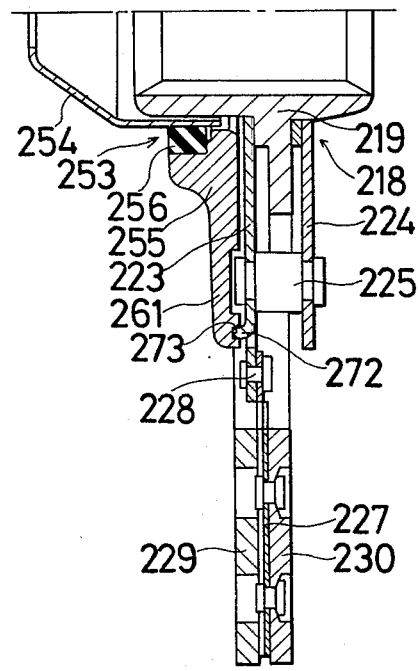
FIG. 7 is a similar view to FIG. 6, but showing a third embodiment of the clutch releasing device according to the present invention.

Referring to FIG. 7, there is shown a third embodiment of the present invention with the same structure as shown in the first embodiment being designated with the same reference numerals in a 200 series. The difference from the foregoing embodiments also resides in the connection between a clutch disc assembly 218 and a second member 255 of a clutch releasing device 253. A clutch plate 223 of the clutch disc assembly 218 is provided with axially bent projections 272 which are radially outwardly positioned further than spacer rivets 225. Extreme ends of the arm portions 261 of the second member 255 are provided with channels 273 which rigidly receive the projections 272 of the clutch plate 223.

Figure 8:
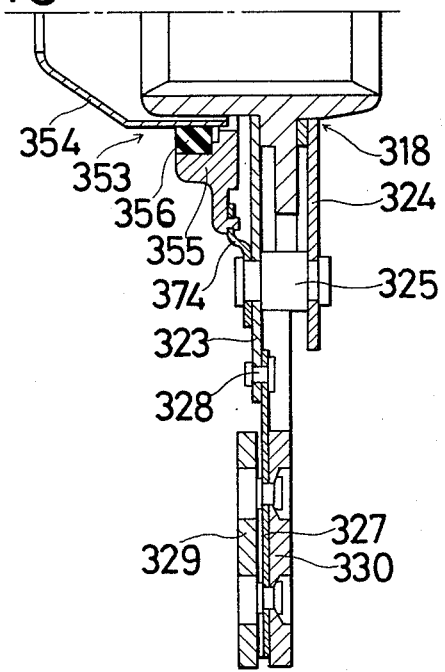
FIG. 8 is a similar view to FIG. 6, but showing a fourth embodiment of the clutch releasing device according to the present invention.

Referring to FIG. 8, there is shown a fourth embodiment of the present invention with the same structure as shown in the first embodiment being designated with the same reference numerals in a 300 series. The difference from the foregoing embodiments also resides in the connection between a clutch disc assembly 318 and a second member 355 of the clutch releasing device 353.

The clutch disc assembly 318 is added with brackets 374 which are disposed on the side face of the clutch plate 323 and are secured to the clutch plate 323 by spacer rivets 325. The inner ends of the brackets 374 are axially spaced from the clutch plate 323 and the second member 355 of the clutch releasing device 353 is connected to the inner ends of the brackets 374. The connecting manner between the second member 355 and the brackets 374 is similar to the connecting manner between the second member 255 and the clutch plate 223 in the second embodiment.

Figure 9:
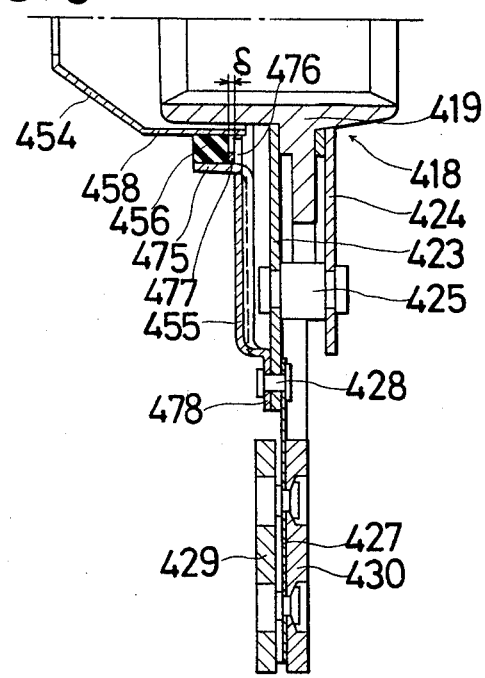
FIG. 9 is a similar view to FIG. 6, but showing a fifth embodiment of the clutch releasing device according to the present invention.

Referring to FIG. 9, there is shown a fifth embodiment of the present invention with the same structure as shown in the first embodiment being designated with the same reference numerals in a 400 series. The main difference from the foregoing embodiments resides in the structure of a second member 455 of the clutch releasing device 453. The second member 455 made of sheet metal includes axially bent fingers 475 and radial fingers 476 at inner periphery thereof. The axially bent fingers 475 receive the outer periphery of an annular resilient member 456 so as to cause the frictional engagement between the inner peripheral surface of the annular resilient member 456 and the outer surface of the straight cylindrical portion 458 of the first member 454. A spacer ring 477 is interposed between the side face of the annular resilient member 456 and the radial fingers 476 so as to provide an axial space δ between the inner peripheral portion of the side face of the annular resilient member 456 and the inner ends of the radial fingers 476. The second member 455 is secured at its outer peripheral portion 478 to the clutch plate 423 of the clutch disc assembly 418 by rivets 428.

Figure 10:
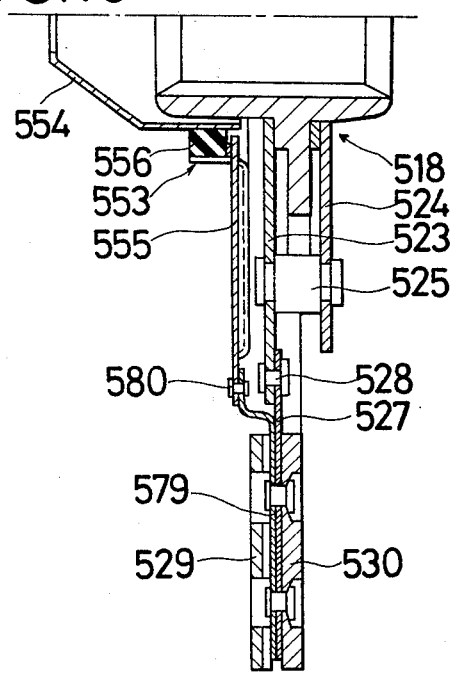
FIG. 10 is a similar view to FIG. 6, but showing a sixth embodiment of the clutch releasing device according to the present invention.

Referring to FIG. 10, there is shown a sixth embodiment of the present invention with the same structure as shown in the first embodiment being designated with the same reference numerals in a 500 series. The difference from the foregoing embodiments resides in the connection between a clutch disc assembly 518 and a second member 555 of the clutch releasing device 553. The clutch disc assembly 518 is added with brackets 579 which are interposed between friction facings 529 and 530 and are secured to the spring cushion 527 by friction facing securing rivets. The inner ends of the brackets 579 are axially spaced from the clutch plate 523 and the second member 555 of the clutch releasing device 553 is secured to the inner ends of the brackets 579 by securing rivets 580.

Figure 11:
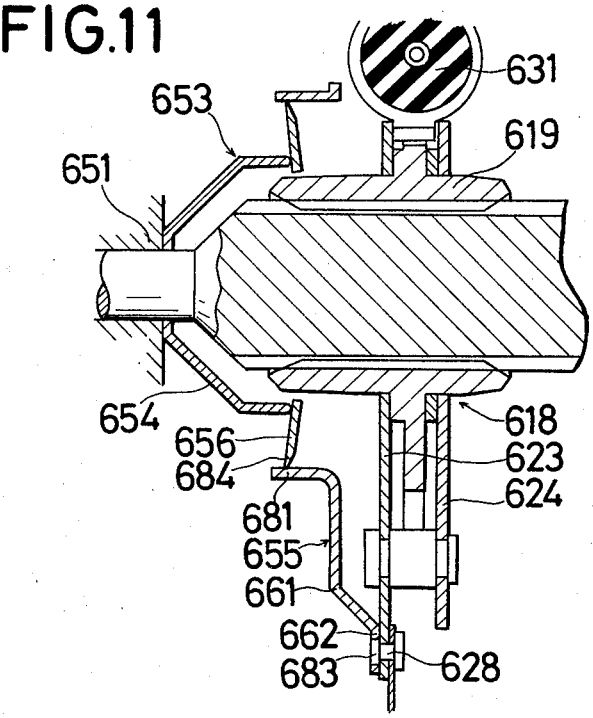
FIG. 11 is an enlarged part of axial section view of a seventh embodiment of the clutch releasing device according to the present invention attached to clutch disc assembly.
Figure 12:
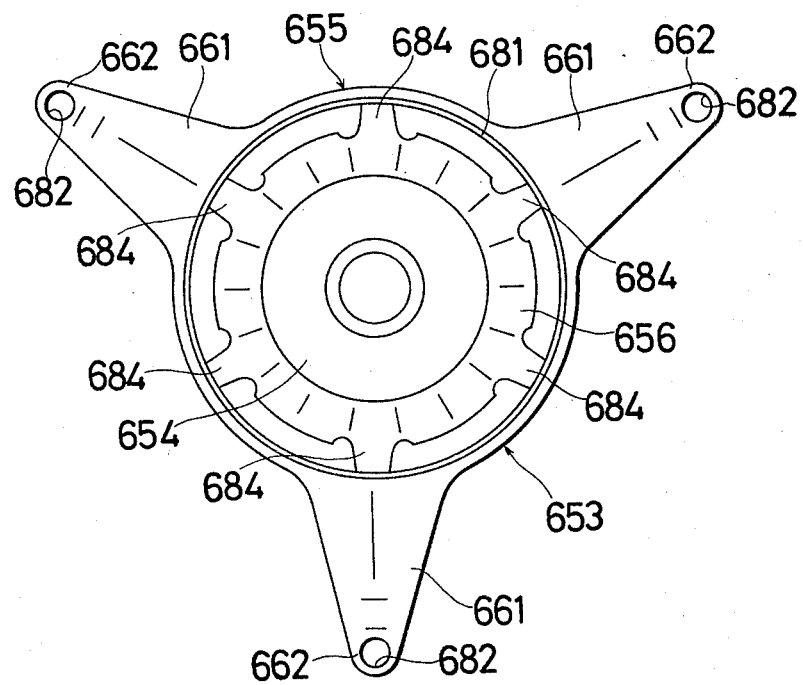
FIG. 12 is a side view of the clutch releasing device shown in FIG. 11.

Referring to FIGS. 11 and 12, there is shown a seventh embodiment of the present invention with the same structure as shown in the first embodiment being designated with the same reference numerals in a 600 series. The main difference from the foregoing embodiments resides in the structure of the clutch releasing device 653. The clutch releasing device 653 includes a first member 654, a second member 655 and an annular dish spring 656 as an annular resilient member. The second member 655 includes a straight cylindrical portion 681 for receiving the annular dish spring 656 therein and a plurality of arm portions 661 radially outwardly extending from one end of the straight cylindrical portion 681. The arm portions 661 are provided with contact portions 662 at extreme ends thereof, and the contact portions 662 are provided with holes 682 which receive the heads 683 of the rivets 628 therein. The annular dish spring 656 is provided with fingers 684 radially outwardly extending from the outer periphery thereof. The extreme ends of the fingers 684 of the annular dish spring 656 are frictionally engaged with the inner peripheral surface of the straight cylindrical portion 681 of the second member 656 so as to cause a predetermined sliding resistance therebetween similar to sliding resistance between the straight cylindrical portion 58 and the annular resilient member 56 in the first embodiment. The inner peripheral portion of the annular dish spring 656 is in contact with the one end of the first member 654 which is in contact with the side face of the inner race 651 of the pilot bearing. Thus, when the clutch assembly is engaged, the annular dish spring 656 is deformed as shown in FIG. 11. When the clutch is released, the clutch disc assembly 618 is moved in the rightward direction in FIG. 11 by the resiliency of the annular dish spring 656 until the annular dish spring 656 returns to its original shape.

Obviously, many modifications and variations of the present invention are possible in light of the above. It is, therefore, to be understood that within the scope of the appended claims, the invention may be practicable otherwise than as specifically described herein.

What is claimed is:

1. A clutch releasing device comprising;
   a clutch disc assembly including a hub drivingly and axially slidably mounted on a transmission input shaft and provided with a flange at outer periphery thereof, a clutch plate disposed on one side of said flange, a side washer disposed on another side of said flange, spacer rivets connecting said clutch plate and said side washer to each other, and friction facings mounted on said clutch plate and disposed between a flywheel secured to an engine crankshaft and a pressure plate drivingly and axially movably connected to said flywheel,
   a pilot bearing for rotatably supporting an extreme end portion of said transmission input shaft on either said engine crankshaft or said flywheel,
   a first member disposed between said clutch disc assembly and an inner race of said pilot bearing and being in contact with a side face of said inner race at one end thereof,
   a second member disposed between said clutch disc assembly and said pilot bearing and concentrically arranged with respect to said first member and operatively connected at a radially outward position from said spacer rivets to said clutch disc assembly,
   an annular resilient member disposed between said first member and said second member so as to cause deformation of said annular resilient member when the clutch is engaged and to cause axial sliding between said annular resilient member and either said first member or said second member in accordance with wear of said friction facings.

2. A clutch releasing device as set forth in claim 1, said second member further comprising an annular portion for mounting said annular resilient member thereto and a plurality of arm portions radially outwardly extending from said annular portion for connecting said second member to said clutch disc assembly.

3. A clutch releasing device as set forth in claim 2, wherein said arm portions of said second member include recesses formed therein at extreme end portions thereof which receive head portions of said spacer rivets therein, and said arm portions are in contact with a side face portion of said clutch plate at said extreme end portions.

4. A clutch releasing device as set forth in claim 2, said clutch plate further comprising a plurality of axially bent projections which are radially outwardly positioned further than said spacer rivets, and said arm portions of said second member including a plurality of channels formed therein which rigidly receive extreme end portions of said axially bent projections.

5. A clutch releasing device as set forth in claim 2, said clutch plate of said clutch disc assembly including a plurality of holes formed therein which are radially outwardly positioned further than said spacer rivets, and said arm portions of said second member further comprising a plurality of axial mushroom-shaped projections with snap action to be snap fitted in said holes.

6. A clutch releasing device as set forth in claim 1, further comprising a plurality of brackets secured to said clutch assembly by said spacer rivets, wherein said second member is connected to said clutch disc assembly through brackets.

7. A clutch releasing device as set forth in claim 1, said clutch disc assembly further comprising a plurality of securing rivets and a plurality of spring cushions for supporting said friction facings on said clutch plate wherein said spring cushions are secured to an outer peripheral portion of said clutch plate by said securing rivets, and said second member is connected to said clutch disc assembly by said securing rivets.

8. A clutch releasing device as set forth in claim 1, said clutch disc assembly further comprising a plurality of spring cushions for supporting said friction facings on said clutch plate, and said second member further comprising a plurality of brackets wherein said second member is connected to said clutch disc assembly through said plurality of brackets which are secured to said spring cushions together with said friction facings.

9. A clutch releasing device as set forth in claim 1, wherein said annular resilient member is made of rubber and has a rectangular cross-section, and said annular resilient member is secured at its outer peripheral portion to said second member and is frictionally engaged at its inner periphery to outer surface of a straight cylindrical portion of said first member.

10. A clutch releasing device as set forth in claim 1, said annular resilient member comprising an annular dish spring having a plurality of fingers radially outwardly extending from outer periphery thereof, said second member further comprising a straight cylindrical portion which receives said annular dish spring therein, wherein said first member axially receives an inner periphery portion of said annular dish spring, and said fingers of said annular dish spring are frictionally engaged at extreme ends thereof to an inner surface portion of said straight cylindrical portion of said second member.

* * * * *